(12) United States Patent
Kasha et al.

(10) Patent No.: US 8,280,319 B2
(45) Date of Patent: *Oct. 2, 2012

(54) TUNING CIRCUITRY IN A COMMUNICATIONS DEVICE

(75) Inventors: Dan B. Kasha, Seattle, WA (US); Aslamali A. Rafi, Austin, TX (US); Abhishek V. Kammula, Austin, TX (US); Peter J. Vancorenland, Austin, TX (US); George T. Tuttle, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/824,908

(22) Filed: Jun. 28, 2010

(65) Prior Publication Data

US 2010/0267350 A1 Oct. 21, 2010

Related U.S. Application Data

(63) Continuation of application No. 11/394,451, filed on Mar. 31, 2006, now Pat. No. 7,747,228.

(51) Int. Cl.
*H01Q 11/12* (2006.01)
*H04B 1/04* (2006.01)

(52) U.S. Cl. ........ 455/91; 455/120; 455/125; 455/127.1

(58) Field of Classification Search .......... 455/120–125, 455/129, 575.7, 91, 120–127.1
See application file for complete search history.

(56) References Cited

U.S. PATENT DOCUMENTS

| | | |
|---|---|---|
| 5,471,665 A | 11/1995 | Pace et al. |
| 5,493,710 A | 2/1996 | Takahara et al. |
| 5,541,558 A | 7/1996 | Weber et al. |
| 5,661,434 A | 8/1997 | Brozovich et al. |
| 6,125,048 A | 9/2000 | Loughran et al. |
| 6,219,532 B1 | 4/2001 | Tanaka et al. |
| 6,240,279 B1 | 5/2001 | Nitta et al. |
| 6,307,525 B1 | 10/2001 | Bateman et al. |
| 6,339,398 B1 | 1/2002 | Redvik et al. |
| 6,349,216 B1 * | 2/2002 | Alberth et al. ............. 455/550.1 |
| 6,473,600 B1 | 10/2002 | Dvorkin |
| 6,591,087 B1 | 7/2003 | Oda |
| 6,731,161 B1 | 5/2004 | O'Leary |
| 6,741,867 B1 | 5/2004 | Tetsuya |
| 6,801,042 B2 | 10/2004 | McPherson et al. |
| 7,071,776 B2 * | 7/2006 | Forrester et al. ............. 330/129 |
| 7,127,217 B2 | 10/2006 | Tuttle et al. |
| 7,142,829 B2 | 11/2006 | Sung et al. |

(Continued)

OTHER PUBLICATIONS

Kasha, "Dual Antenna Communications Device", Office Action, U.S. Appl. No. 11/396,132, Jan. 31, 2012, 10 pgs.

(Continued)

*Primary Examiner* — Simon Nguyen
(74) *Attorney, Agent, or Firm* — O'Keefe, Egan, Peterman & Enders LLP

(57) ABSTRACT

A communications device is provided. The communications device includes a first antenna port coupled to a signal line, transmitter circuitry coupled to the signal line and configured to broadcast a radio frequency (RF) output signal across the first antenna port, tuning circuitry coupled to the signal line, and a controller configured to adjust a tuning of the tuning circuitry. The first antenna port, the transmitter circuitry, the tuning circuitry, and the controller are at least partially integrated on the same integrated circuit.

23 Claims, 9 Drawing Sheets

U.S. PATENT DOCUMENTS

| | | | |
|---|---|---|---|
| 7,149,483 | B1 | 12/2006 | Reinisch et al. |
| 7,206,553 | B2 | 4/2007 | Meck |
| 7,272,375 | B2 | 9/2007 | Tuttle et al. |
| 7,379,714 | B2* | 5/2008 | Haque et al. .......... 455/107 |
| 7,486,937 | B2 | 2/2009 | Kandola et al. |
| 7,747,228 | B2 | 6/2010 | Kasha et al. |
| 7,904,035 | B2 | 3/2011 | Kasha et al. |
| 2002/0105474 | A1* | 8/2002 | Kitamura et al. ......... 343/850 |
| 2002/0158689 | A1 | 10/2002 | Harris et al. |
| 2003/0083836 | A1 | 5/2003 | Spencer |
| 2004/0217867 | A1 | 11/2004 | Bridgelall et al. |
| 2004/0266371 | A1 | 12/2004 | Summers et al. |
| 2005/0026573 | A1 | 2/2005 | Cho |
| 2005/0079825 | A1 | 4/2005 | Omori et al. |
| 2005/0143024 | A1 | 6/2005 | Sung et al. |
| 2007/0010217 | A1* | 1/2007 | Takahashi et al. ........ 455/121 |
| 2007/0129031 | A1 | 6/2007 | Newton et al. |
| 2007/0232248 | A1 | 10/2007 | Kasha et al. |
| 2007/0232367 | A1 | 10/2007 | Kasha et al. |

OTHER PUBLICATIONS

Kasha, "Tuning Circuitry in a Communication Device", Restriction Requirement, U.S. Appl. No. 11/394,451, Sep. 19, 2008, 7 pgs.

Kasha, "Tuning Circuitry in a Communication Device", Response to Restriction Requirement, U.S. Appl. No. 11/394,451, Oct. 7, 2008, 1 pg.

Kasha, "Tuning Circuitry in a Communication Device", Office Action, U.S. Appl. No. 11/394,451, Dec. 15, 2008, 8 pgs.

Kasha, "Tuning Circuitry in a Communication Device", Amendment and Response, U.S. Appl. No. 11/394,451, Mar. 16, 2009, 10 pgs.

Kasha, "Tuning Circuitry in a Communication Device", Final Office Action, U.S. Appl. No. 11/394,451, May 21, 2009, 8 pgs.

Kasha, "Tuning Circuitry in a Communication Device", Amendment and Response, U.S. Appl. No. 11/394,451, Aug. 21, 2009, 10 pgs.

Kasha, "Tuning Circuitry in a Communication Device", Office Action, U.S. Appl. No. 11/394,451, Oct. 8, 2009, 9 pgs.

Kasha, "Tuning Circuitry in a Communication Device", Amendment and Response, U.S. Appl. No. 11/394,451, Jan. 8, 2010, 12 pgs.

Kasha, "Tuning Circuitry in a Communication Device", Notice of Allowance and Fees Due, U.S. Appl. No. 11/394,451, Feb. 18, 2010, 6 pgs.

Kasha, "Calibration System and Method in a Communication Device", Office Action, U.S. Appl. No. 11/394,624, Apr. 29, 2009, 11 pgs.

Kasha, "Calibration System and Method in a Communication Device", Amendment and Response, U.S. Appl. No. 11/394,624, Jul. 29, 2009, 11 pgs.

Kasha, "Calibration System and Method in a Communication Device", Office Action, U.S. Appl. No. 11/394,624, Dec. 7, 2009, 14 pgs.

Kasha, "Calibration System and Method in a Communication Device", Amendment and Response, U.S. Appl. No. 11/394,624, Apr. 7, 2010, 11 pgs.

Kasha, "Calibration System and Method in a Communication Device", Office Action, U.S. Appl. No. 11/394,624, May 21, 2010, 5 pgs.

Kasha, "Calibration System and Method in a Communication Device", Amendment and Response, U.S. Appl. No. 11/394,624, Aug. 23, 2010, 10 pgs.

Kasha, "Calibration System and Method in a Communication Device", Notice of Allowance and Fees Due, U.S. Appl. No. 11/394,624, Nov. 1, 2010, 10 pgs.

Kasha, "Antenna Compensation System and Method in a Communication Device", Office Action, U.S. Appl. No. 11/396,129, Jun. 25, 2009, 9 pgs.

Kasha, "Antenna Compensation System and Method in a Communication Device", Amendment and Response, U.S. Appl. No. 11/396,129, Sep. 25, 2009, 10 pgs.

Kasha, "Antenna Compensation System and Method in a Communication Device", Office Action, U.S. Appl. No. 11/396,129, Dec. 9, 2009, 12 pgs.

Kasha, "Antenna Compensation System and Method in a Communication Device", Amendment and Response, U.S. Appl. No. 11/396,129, Apr. 9, 2010, 11 pgs.

Kasha, "Antenna Compensation System and Method in a Communication Device", Office Action, U.S. Appl. No. 11/396,129, Apr. 28, 2010, 12 pgs.

Kasha, "Antenna Compensation System and Method in a Communication Device", Amendment and Response, U.S. Appl. No. 11/396,129, Jul. 28, 2010, 10 pgs.

Kasha, "Antenna Compensation System and Method in a Communication Device", Office Action, U.S. Appl. No. 11/396,129, Oct. 13, 2010, 11 pgs.

Kasha, "Antenna Compensation System and Method in a Communication Device", Notice of Appeal, U.S. Appl. No. 11/396,129, Mar. 7, 2011, 2 pgs.

Kasha, "Antenna Compensation System and Method in a Communication Device", Pre Appeal Brief, U.S. Appl. No. 11/396,129, Mar. 7, 2011, 5 pgs.

Kasha, "Antenna Compensation System and Method in a Communication Device", Office Action, U.S. Appl. No. 11/396,129, Jun. 28, 2011, 12 pgs.

Kasha, "Antenna Compensation System and Method in a Communication Device", Amendment and Response, U.S. Appl. No. 11/396,129, Sep. 28, 2011, 15 pgs.

Kandola, "Wireless Transmitter Front-End Topology Employing Auxiliary Transmit-Path for Lower-Powered Signals to Enhance RF Power Amplifier Efficiency", U.S. Appl. No. 60/683,123, filed May 17, 2005, 9 pgs.

Kasha, "Dual Antenna Communication Device", Office Action, U.S. Appl. No. 11/396,132, Dec. 29, 2008, 15 pgs.

Kasha, "Dual Antenna Communication Device", Amendment and Response, U.S. Appl. No. 11/396,132, Mar. 24, 2009, 10 pgs.

Kasha, "Dual Antenna Communication Device", Office Action, U.S. Appl. No. 11/396,132, Jun. 10, 2009, 17 pgs.

Kasha, "Dual Antenna Communication Device", Notice of Appeal, U.S. Appl. No. 11/396,132, Oct. 13, 2009, 2 pgs.

Kasha, "Dual Antenna Communication Device", Pre Appeal Brief, U.S. Appl. No. 11/396,132, Oct. 13, 2009, 5 pgs.

Kasha, "Dual Antenna Communication Device", Appeal Brief, U.S. Appl. No. 11/396,132, Dec. 17, 2009, 24 pgs.

Kasha, "Dual Antenna Communication Device", Office Action, U.S. Appl. No. 11/396,132, Mar. 19, 2010, 16 pgs.

Kasha, "Dual Antenna Communication Device", Amendment and Response, U.S. Appl. No. 11/396,132, Jul. 19, 2010, 11 pgs.

Kasha, "Dual Antenna Communication Device", Office Action, U.S. Appl. No. 11/396,132, Oct. 6, 2010, 16 pgs.

Kasha, "Dual Antenna Communication Device", Notice of Appeal, U.S. Appl. No. 11/396,132, Mar. 2, 2011, 2 pgs.

Kasha, "Dual Antenna Communication Device", Pre Appeal Brief, U.S. Appl. No. 11/396,132, Mar. 2, 2011, 5 pgs.

Kasha, "Dual Antenna Communication Device", Appeal Brief, U.S. Appl. No. 11/396,132, Apr. 25, 2011, 21 pgs.

Kasha, "Dual Antenna Communication Device", Amendment, U.S. Appl. No. 11/396,132, Apr. 25, 2011, 8 pgs.

Kasha, "Dual Antenna Communication Device", Office Action, U.S. Appl. No. 11/396,132, May 23, 2011, 17 pgs.

Kasha, "Dual Antenna Communication Device", Amendment and Response, U.S. Appl. No. 11/396,132, Sep. 23, 2011, 16 pgs.

Kasha et al., "Antenna Compensation System and Method in a Communication Device", RCE and Amendment, U.S. Appl. No. 11/396,129, Jun. 1, 2012, 16 pgs.

Kasha et al., "Antenna Compensation System and Method in a Communications Device" Office Action, U.S. Appl. No. 11/396,129, Mar. 1, 2012, 23 pgs.

Kasha et al., "Dual Antenna Communications Device" Response to Office Action; U.S. Appl. No. 11/396,132, Apr. 25, 2012, 5 pgs.

Kasha et al., "Dual Antenna Communications Device", Notice of Allowance, U.S. Appl. No. 11/396,132, Jun. 17, 2012, 11 pgs.

* cited by examiner

| FREQUENCY | COMPENSATION |
|---|---|
| 76 MHz | +10% |
| 84 MHz | +5% |
| 92 MHz | 0 |
| 100 MHz | -5% |
| 108 MHz | -10% |

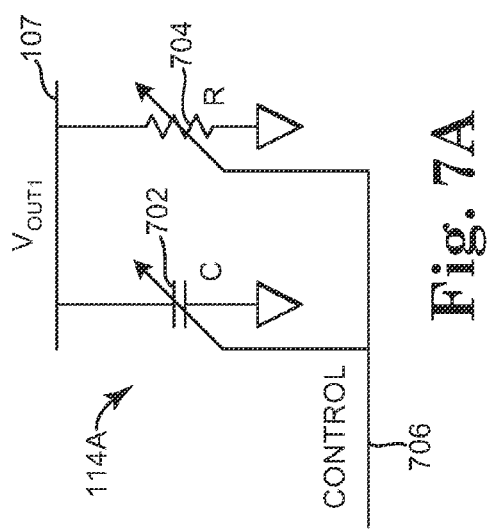
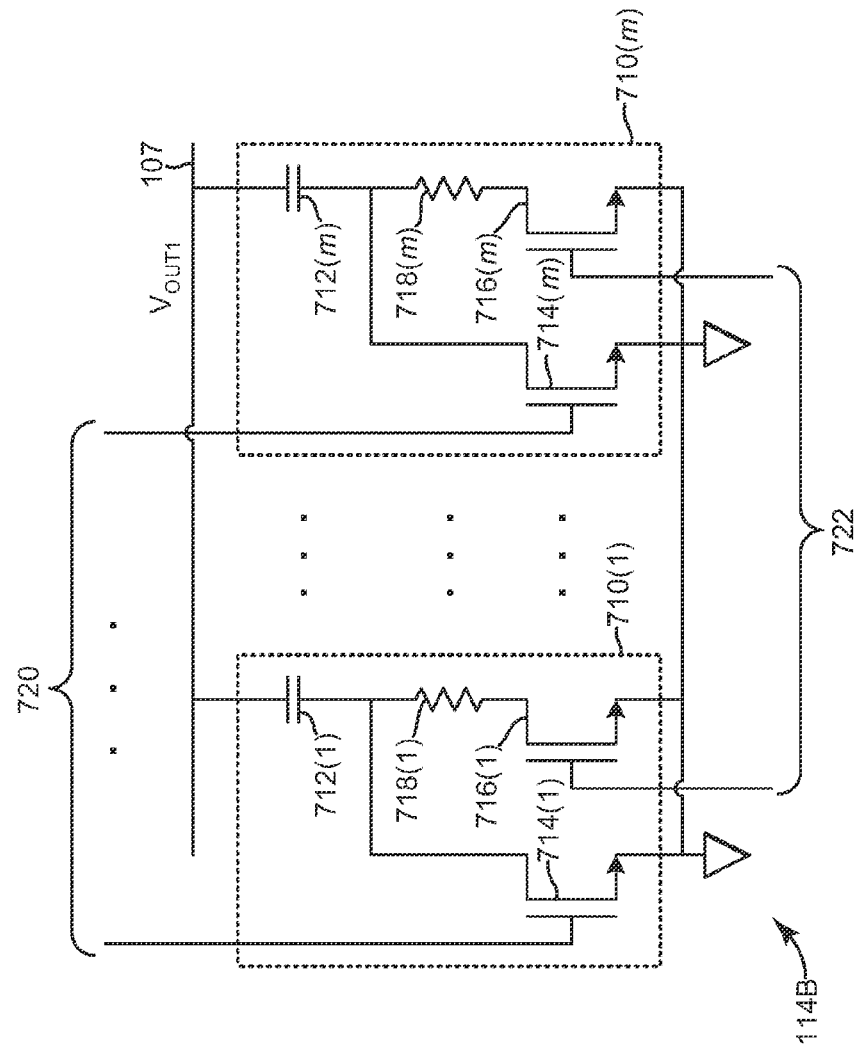
Fig. 7A
Fig. 7B

TUNING CIRCUITRY IN A COMMUNICATIONS DEVICE

REFERENCE TO RELATED APPLICATION

This application is a continuation of U.S. patent application Ser. No. 11/394,451, filed Mar. 31, 2006, and entitled "TUNING CIRCUITRY IN A COMMUNICATIONS DEVICE".

BACKGROUND

Radio frequency (RF) transmitters are used in a wide variety of applications such as cellular or mobile telephones, cordless telephones, personal digital assistants (PDAs), computers, radios and other devices that transmit RF signals. As transmitters become increasingly integrated and more portable, the efficiency in generating and transmitting an output signal of the transmitter tends to increase in importance. For example, a transmitter may seek to minimize the amount of power it uses to generate and transmit a signal to prolong the operation of a portable power source such as a battery.

Electrical circuit properties of a transmitter and an antenna connected to the transmitter affect the operation of the transmitter. These properties may cause a transmitter to operate with increased or decreased efficiency, depending on the properties of the transmitter and the antenna. Although manufacturers of transmitters and antenna typically provide typical electrical circuit properties of these components, these properties may vary slightly from component to component and result in an operation of the components that is less than optimal in some configurations. In addition, system designers may have a need for flexibility of the electrical circuit properties of a component to meet design criteria of a larger system.

SUMMARY

According to one exemplary embodiment, a communications device is provided. The communications device includes a first antenna port coupled to a signal line, transmitter circuitry coupled to the signal line and configured to broadcast a radio frequency (RF) output signal across the first antenna port, tuning circuitry coupled to the signal line, and a controller configured to adjust a tuning of the tuning circuitry. The first antenna port, the transmitter circuitry, the tuning circuitry, and the controller are at least partially integrated on the same integrated circuit.

BRIEF DESCRIPTION OF THE DRAWINGS

FIG. 7A is a schematic diagram illustrating one embodiment of tuning circuitry.

FIG. 7B is a schematic diagram illustrating another embodiment of tuning circuitry.

DETAILED DESCRIPTION

Figure 1:
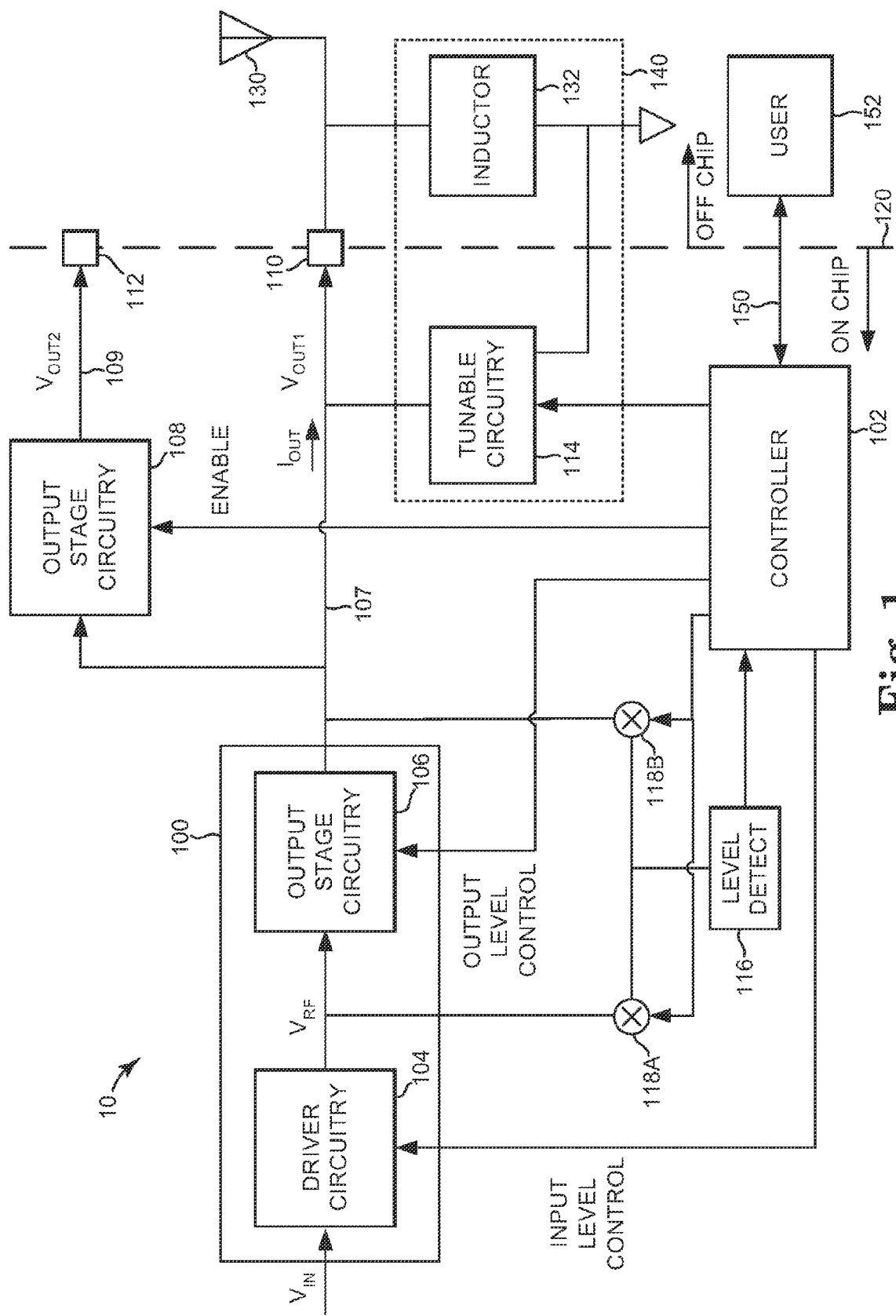
FIG. 1 is a block diagram illustrating one embodiment of a communications device.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, an integrated low power communications device is provided for use in transmitting radio-frequency (RF) signals or signals from other frequency bands. According to one or more embodiments, the communications device includes dual antenna ports, tuning circuitry connected to at least one of the antenna ports, adjustable level circuitry for the input and output signals to and from the output stage of the transmitter, and calibration circuitry. The dual antenna ports allow the communications device to be optimized for various types of antenna. The tuning circuitry, adjustable level circuitry, and calibration circuitry provide the ability to filter, adjust and calibrate the output of the transmitter for various frequencies and signal levels. The adjustable level circuitry also allows the communications device to compensate for antenna properties over a range of frequencies. The dual antenna ports, tuning circuitry, adjustable level circuitry, and calibration circuitry may be at least partially integrated on-chip, i.e., at least partially integrated the same integrated circuit, according to one or more embodiments.

The on-chip dual antenna ports, tuning circuitry, adjustable level circuitry, and calibration circuitry described herein may be used with respect to a wide variety of integrated communications systems. The low power radio-frequency (RF) integrated transmitter and transceiver embodiments described below with reference to FIGS. 1 and 10, respectively, represent integrated communications devices that can take advantage of the dual antenna ports, tuning circuitry, adjustable level circuitry, and calibration circuitry described herein. Although terrestrial RF broadcast transmitters, e.g., FM and AM transmitters, are described herein, these transmitters are presented by way of example. In other embodiments, other broadcast bands may be used.

The architectures of the communications devices described herein may advantageously provide flexibility in selecting an antenna for use with the devices while allowing efficient operation of the devices. In addition, architectures may advantageously increase the quality of a transmitted signal by providing optimal filtering and tuning of the signal. The architectures may also advantageously optimize power consumption by adjusting a signal level of the output signal to an optimum level. Further, the architectures may advantageously provide for the shared use of components in a device with both a transmitter and a receiver.

FIG. 1 is a block diagram illustrating a communications device 10 that forms an integrated terrestrial RF broadcast transmitter according to one embodiment. Communications device 10 includes a transmitter circuitry 100 and a controller 102. Transmitter circuitry 100 includes driver circuitry 104 and output stage circuitry 106. Controller 102 controls the operation and signal levels of driver circuitry 104 using input level control and output stage circuitry 106 using output level control signals.

Driver circuitry 104 receives an input voltage signal, $V_{IN}$. The input voltage signal may be received by driver circuitry 104 in any suitable analog or digital form. Driver circuitry 104 generates a radio frequency (RF) voltage signal, $V_{RF}$, using the input voltage signal and provides the RF voltage signal to output stage circuitry 106. Output stage circuitry 106 receives the RF voltage signal, generates a first RF output voltage signal, $V_{OUT1}$, and RF output current, $I_{OUT}$, and provides the first RF output voltage signal and the RF output current on a signal line 107 to output stage circuitry 108 and a first antenna port 110. Output stage circuitry 108 receives the first RF output voltage signal, generates a second RF output voltage signal, $V_{OUT2}$, and provides the second RF output voltage signal on a signal line 109 to a second antenna port 112.

Antenna ports 110 and 112 are configured to be connected to separate antennas. Each antenna port 110 and 112 forms an output pad in integrated communications device 10 that includes a conductor configured to couple to an antenna or other circuitry that is external to communications device 10. The output pads may be coupled to electrostatic discharge (ESD) protection circuitry (not shown) or other output buffer circuitry (not shown) in communications device 10. In the embodiment shown in FIG. 1, an antenna 130 and an inductor 132 connect to antenna port 110. In other embodiments, antenna 130 and inductor 132 may be omitted and another antenna (not shown) may connect to antenna port 112. In further embodiments, inductor 132 may omitted, located integrated on-chip with communications device 10, or represent the inductance of antenna 130. In some embodiments, output stage circuitry 108 and antenna port 112 may not be used.

Tuning circuitry 114 and inductor 132 are coupled in parallel between signal line 107 and ground (or other suitable potential) to connect to antenna port 110, the output of transmitter circuitry 100, and the input of output stage circuitry 108. Tuning circuitry 114 and inductor 132 combine to form LC filter circuitry 140. Controller 102 provides control signals to tuning circuitry 114 to adjust the amount of capacitance and/or resistance of that tuning circuitry 114 provides on antenna port 110 to adjust the filter response of LC filter circuitry 140. By adjusting the amount of capacitance and/or resistance of tuning circuitry 114, controller 102 also affects the signal response on antenna port 112.

Level detect circuitry 116 connects to the output of driver circuitry 104 across a switch 118A and to the output of output stage circuitry 106 across a switch 118B. Controller 102 provides control signals to each switch 118A and 118B to selectively connect the output of driver circuitry 104 and/or the output of output stage circuitry 106 to level detect circuitry 116. When connected to the output of driver circuitry 104, level detect circuitry 116 detects the RF voltage signal, $V_{RF}$, and provides one or more signal level measurements of the RF voltage signal to controller 102. When connected to the output of output stage circuitry 106, level detect circuitry 116 detects the first RF output voltage signal, $V_{OUT1}$, and provides one or more signal level measurements, i.e. amplitudes, of the first output voltage signal to controller 102. In other embodiments, switch 118A and/or switch 118B may be omitted or replaced with equivalent circuitry. In addition, additional switches or other circuitry (not shown) may be included to allow level detect circuitry 116 to detect the second RF output voltage signal, $V_{OUT2}$, and provide one or more signal level measurements, i.e. amplitudes, of the second output voltage signal to controller 102.

Controller 102 includes a connection 150 that is configured to allow a user 152 to provide information to and receive information from controller 102. The information provided by user 152 to controller 102 may be used to select the output signal frequency generated by transmitter circuitry 100 and may include antenna compensation information as described in additional detail below.

As illustrated by a line 120 in FIG. 1, transmitter circuitry 100, controller 102, output stage circuitry 108, tuning circuitry 114, level detect circuitry 116, and switches 118A and 118B are located on-chip and are at least partially integrated on the same integrated circuit (i.e., on a single chip that is formed on a common substrate) according to one embodiment. Antenna 130 and inductor 132 are located off-chip (i.e., external to the common substrate that includes communications device 10).

As used herein, an RF signal means an electrical signal conveying useful information and having a frequency from about 3 kilohertz (kHz) to thousands of gigahertz (GHz), regardless of the medium through which the signal is conveyed. Thus, an RF signal may be transmitted through air, free space, coaxial cable, and/or fiber optic cable, for example.

For purposes of illustration, the output signals of communications device 10 described herein may be transmitted in signal bands such as AM audio broadcast bands, FM audio broadcast bands, television audio broadcast bands, weather channel bands, or other desired broadcast bands. The following table provides example frequencies and uses for various broadcast bands that may be transmitted by communications device 10.

TABLE 1

EXAMPLE FREQUENCY BANDS AND USES

| FREQUENCY | USES/SERVICES |
|---|---|
| 150-535 kHz | European LW radio broadcast 9 kHz spacing |
| 535-1700 kHz | MW/AM radio broadcast U.S. uses 10 kHz spacing Europe uses 9 kHz spacing |
| 1.7-30 MHz | SW/HF international radio broadcasting |
| 46-49 MHz | Cordless phones, baby monitors, remote control |
| 59.75 (2) MHz | U.S. television channels 2-6 (VHF_L) |
| 65.75 (3) MHz | 6 MHz channels at 54, 60, 66, 76, 82 |
| 71.75 (4) MHz | Audio carrier is at 5.75 MHz (FM MTS) |
| 81.75 (5) MHz | |
| 87.75 (6) MHz | |
| 47-54 (E2) MHz | European television |
| 54-61 (E3) MHz | 7 MHz channels, FM sound |
| 61-68 (E4) MHz | Band I: E2-E4 |
| 174-181 (E5) MHz | Band II: E5-E12 |
| 181-188 (E6) MHz | |
| 188-195 (E7) MHz | |
| 195-202 (E8) MHz | |
| 202-209 (E9) MHz | |
| 209-216 (E10) MHz | |
| 216-223 (E11) MHz | |
| 223-230 (E12) MHz | |
| 76-91 MHz | Japan FM broadcast band |
| 87.9-108 MHz | U.S./Europe FM broadcast band |

TABLE 1-continued

EXAMPLE FREQUENCY BANDS AND USES

| FREQUENCY | USES/SERVICES |
|---|---|
| | 200 kHz spacing (U.S.) |
| | 100 kHz spacing (Europe) |
| 162.550 (WX1) MHz | U.S. Weather Band |
| 162.400 (WX2) MHz | 7 channels, 25 kHz spacing |
| 162.475 (WX3) MHz | SAME: Specific Area Message Encoding |
| 162.425 (WX4) MHz | |
| 162.450 (WX5) MHz | |
| 162.500 (WX6) MHz | |
| 162.525 (WX7) MHz | |
| 179.75 (7) MHz | U.S. television channels 7-13 (VHF_High) |
| | 6 MHz channels at 174, 180, 186, 192, 198, 204, 210 |
| 215.75 (13) MHz | FM Sound at 5.75 MHz |
| 182.5 (F5) MHz | French television F5-F10 Band III |
| | 8 MHz channels |
| 224.5 (F10) MHz | Vision at 176, 184, 192, 200, 208, 216 MHz |
| | AM sound at +6.5 MHz |
| 470-478 (21) MHz | Band IV - television broadcasting |
| | Band V - television broadcasting |
| 854-862 (69) MHz | 6 MHz channels from 470 to 862 MHz |
| | U.K. System I (PAL): |
| | Offsets of +/−25 kHz may be used to alleviate co-channel interference |
| | AM Vision carrier at +1.25 (Lower Sideband vestigial) |
| | FMW Sound carrier at +7.25 |
| | Nicam digital sound at +7.802 |
| | French System L (Secam): |
| | Offsets of +/−37.5 kHz may be used |
| | AM Vision carrier at +1.25 (inverted video) |
| | FMW Sound carrier at +7.75 |
| | Nicam digital sound at +7.55 |
| 470-476 (14) MHz | U.S. television channels 14-69 |
| | 6 MHz channels |
| 819-825 (69) MHz | Sound carrier is at 5.75 MHz (FM MTS) |
| | 14-20 shared with law enforcement |

Antenna ports 110 and 112 allow various antennas to be connected to and operate with communications device 10. Antenna port 110 connects to output stage circuitry 106. As will be described below with reference to the embodiment of FIG. 5, output stage circuitry 106 may include a high impedance amplifier, such as a transconductance amplifier 502 (FIG. 5), and high impedance output stage circuitry, such as adjustable level circuitry 504 (FIG. 5), to provide a high impedance on antenna port 110. Antenna port 112 connects to output stage circuitry 108 to provide an impedance on antenna port 112 that differs from the impedance on antenna port 110. For example, the impedance on antenna port 112 may be higher or lower than the impedance on antenna port 110.

Figure 2:
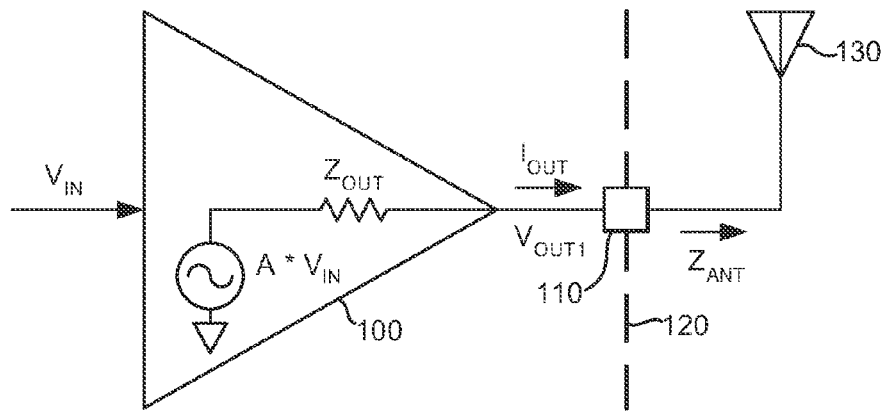
FIG. 2 is a schematic diagram illustrating one embodiment of a transmitter model in a communications device.

FIG. 2 is a schematic diagram illustrating one embodiment of a model of transmitter circuitry 100 in RF applications and specifically, in a portable low power embodiment of transmitter circuitry 100 operating at moderate frequencies such as the FM broadcast band. The input signal is amplified with a gain of A to produce the first RF output voltage signal on antenna port 110. The amplifier presents an impedance to antenna 130 of $Z_{OUT}$, and antenna 130 presents an impedance to the amplifier of $Z_{ANT}$.

The amplifier impedance may be chosen to match the antenna impedance, or an impedance matching network may be inserted between the amplifier output and the antenna to match amplifier impedance and the antenna impedance. By matching the impedances, reflections between the amplifier and the antenna port may be reduced or eliminated.

FIGS. 3A-3D are schematic diagrams illustrating antenna embodiments 302, 312, 322, and 332, respectively, and corresponding antenna circuit models 304, 314, 324, and 334, respectively. Antennas 302, 312, 322, and 332 may each be used with communications device 10 by coupling one of antennas 302, 312, 322, or 332 to one of antenna ports 110 or 112.

Figure 3A:
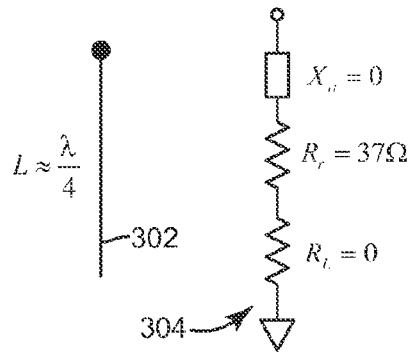
FIGS. 3A-3D are schematic diagrams illustrating embodiments of antennas and antenna circuit models.

FIG. 3A illustrates a quarter-wave antenna 302 perpendicular to a ground plane with a length, L, defined by a wavelength, λ=c/f where c is the speed of light and f is the RF frequency. Impedance model 304 includes a loss resistance, $R_L$, a series reactance, $X_a$, and a radiation resistance, $R_r$, in series. For an ideal quarter-wave antenna 302, the loss resistance, $R_L$, and series reactance, $X_a$, will be zero. The antenna impedance is approximately 37 ohms due to the radiation resistance, $R_r$. The radiation resistance is the equivalent circuit element that converts the dissipated power into radiated power. Many factors may cause the actual impedance to differ significantly from this value. If the RF frequency and required length do not exactly match, the impedance may be greater due to non-zero values for the series reactance. The series reactance may be capacitive if the length is shorter than the ideal length and inductive if the length is longer than the ideal length. If the ground plane is not ideal, the impedance may also differ due to added impedance in the series reactance or the loss resistance or both. If antenna 302 is near other objects, the impedance may differ from that of the ideal antenna.

Figure 3B:
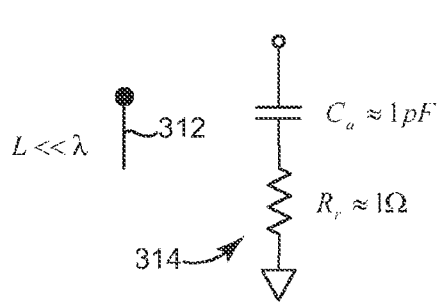

FIG. 3B illustrates a short monopole antenna 312 with a length, L, that is much smaller than a wavelength, λ, as defined above. Impedance model 314 includes a capacitance, $C_a$, in series with a radiation resistance, $R_r$. For an embodiment of antenna 312 of several centimeters at frequencies of 100 MHz, the capacitance may be on the order of 1 pF and the radiation resistance may be on the order of 1 ohm. At this frequency, the total impedance is largely reactive and on the order of 1 kilo-ohm.

Figure 3C:
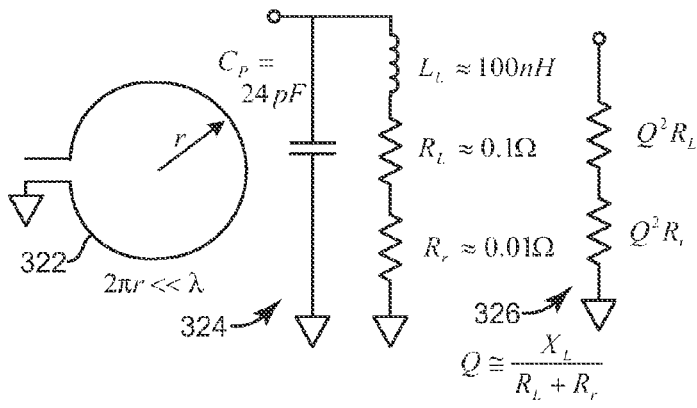

FIG. 3C illustrates a loop antenna 322 that is driven single-ended with the other end at a reference potential. Loop antenna 322 may be chosen to be a small loop with a circumference that is small compared to the wavelength, X, as defined above, in one or more embodiments. Impedance model 324 includes a resonating capacitance, $C_p$, in parallel with a loss resistance, $R_L$, a radiation resistance, $R_r$, and an inductance, $L_L$, connected in series. The inductance is calculated from the geometry of loop antenna 322. For an embodiment of loop antenna 322 of a few centimeters in diameter, the inductance may be on the order of 100 nH. The loss resistance depends on the resistive properties of the conductor used and may be on the order of 0.1 ohm. The radiation resistance may also be very small and may be on the order of 0.01 ohm. When resonated with the resonating capacitance, the network may be of a very high Q, where Q is the ratio of the center frequency of the network to the bandwidth of the network. At the resonant frequency, an impedance model 326 represents the equivalent circuit with the reactance of the capacitor and the inductor canceling each another and the equivalent resistances are multiplied by $Q^2$. Accordingly, loop antenna 322 at resonance may present a very high impedance that may be on the order of several kilo-ohms and may have significant radiation resistance.

Figure 3D:
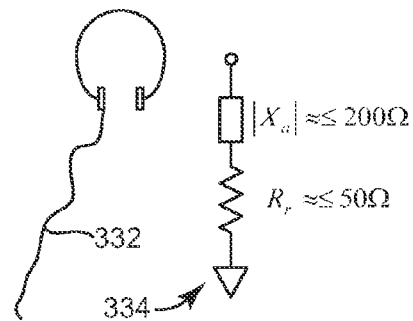

FIG. 3D illustrates a random wire antenna 332 with a length, L, that can vary as smaller or larger than a wavelength, λ, as defined above. Random wire antenna 332 may be implemented by coupling the output from transmitter circuitry 100 to a conductor. The conductor may also serve as a power cord (not shown) or a headphone wire (shown in FIG. 3D), for example. Random wire antenna 332 may approximate quarter-wave antenna 302 as described above with reference to FIG. 3A. Accordingly, the impedance of random wire antenna 332 may vary greatly due to non-ideal length, improper ground plane, and proximity to other objects.

Antennas 302, 312, 322, and 332 illustrate that a transmitter circuitry 100 with an exact driving impedance to match a transmission line or ideal antenna (e.g., a 50 or 75 ohm antenna) may not be a perfect match for many situations. The architecture of communications device 10, as described herein, may advantageously optimize the circuit for driving both high and low impedance antennas.

Figure 4:
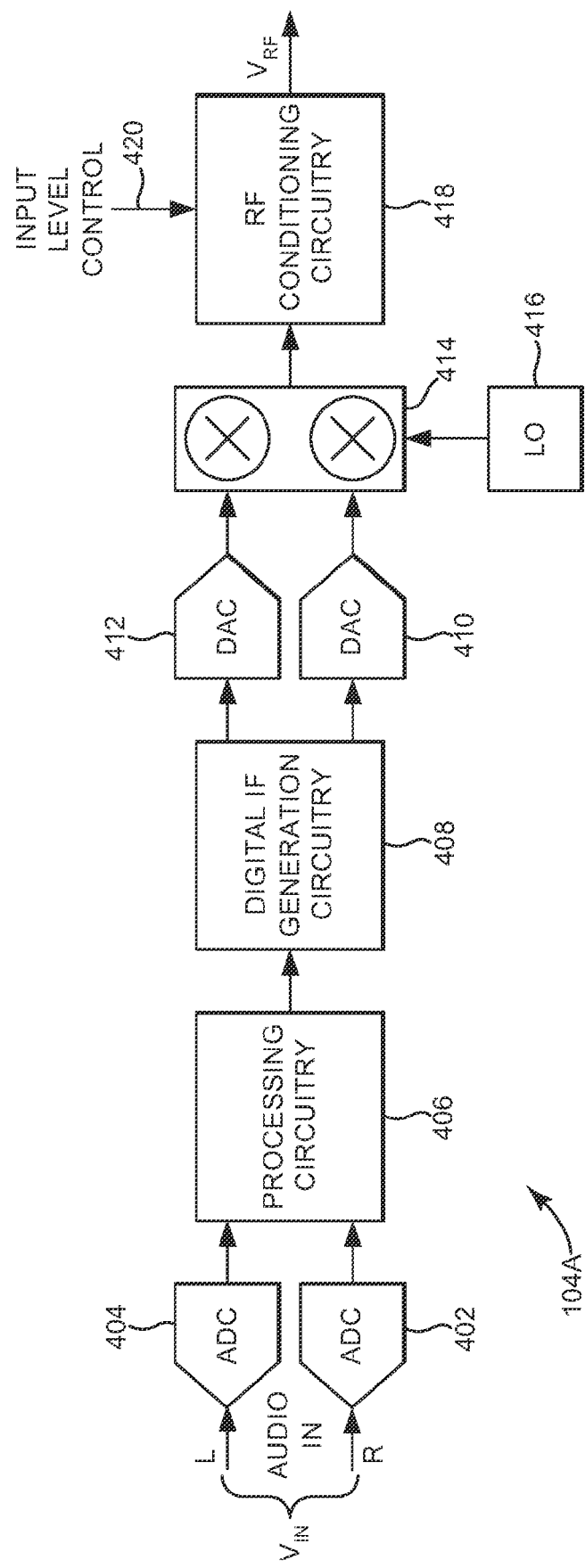
FIG. 4 is a block diagram illustrating one embodiment of selected portions of transmitter circuitry.

FIG. 4 is a block diagram illustrating an embodiment 104A of driver circuitry 104. In embodiment 104A, the input voltage signal, $V_{IN}$, includes left (L) and right (R) analog audio input channels that are received by analog-to-digital converters (ADC) 402 and 404, respectively. ADCs 402 and 404 convert the analog audio input channels to first and second sets N bit digital signals, respectively, and provide the sets of N bit digital signals to processing circuitry 406.

Processing circuitry 406 receives the sets of N bit digital signals from ADCs 402 and 404, respectively. Processing circuitry 406 performs any suitable audio processing on the signal sets such as signal conditioning (e.g., tone, amplitude, or compression) and stereo encoding for FM broadcast. Processing circuitry 406 provides the processed signals to digital intermediate frequency (IF) generation circuitry 408.

Digital IF generation circuitry 408 receives the processed signals from processing circuitry 406. Digital IF generation circuitry 408 upconverts the processed signals to an intermediate frequency and provides the upconverted signals to digital-to-analog converters (DAC) 410 and 412. In the embodiment of FIG. 4, digital IF generation circuitry 408 upconverts the processed signals to produce a quadrature output with real (I) and imaginary (Q) signals. Digital IF generation circuitry 408 provides the real signals to DAC 410 and the imaginary signals to DAC 412. In other embodiments, digital IF generation circuitry 408 upconverts the processed signals to produce other signal types.

DACs 410 and 412 receive the upconverted signals from digital IF generation circuitry 408 and convert the digital upconverted signals to analog signals. DACs 410 and 412 provide the analog signals to RF mixer 414.

RF mixer 414 receives the analog signals from DACs 410 and 412. RF mixer 414 upconverts the analog signals to a desired output (transmit) frequency by combining the analog signals with phase shifted local oscillator (LO) mixing signals provided by local oscillator (LO) generation circuitry 416. LO generation circuitry 416 includes oscillation circuitry (not shown) and outputs the two out-of-phase LO mixing signals that are used by RF mixer 414. RF mixer 414 also combines the real and imaginary signals such that the RF signal forms a real RF signal. RF mixer 414 provides the RF signal to RF conditioning circuitry 418.

RF conditioning circuitry 418 receives the RF signal from RF mixer 414. RF conditioning circuitry 418 filters the RF signal to remove undesired signals and adjusts a signal level, i.e. amplitude, of the RF signal to a desired level in response to an input level control signal 420 from controller 102. RF conditioning circuitry 418 provides the adjusted RF voltage signal, $V_{RF}$, to output stage circuitry 106 (FIG. 1). In setting the signal level of the RF signal, controller 102 activates switch 118A to couple level detect circuitry 116 to the RF voltage signal. Level detect circuitry 116 detects the signal level of the RF voltage signal and provides any suitable inputs to controller 102 to identify the signal level of the RF voltage signal to controller 102. Controller 102 may iteratively adjust the signal level and receive feedback from level detect circuitry 116 until a desired signal level is achieved. Controller 102 may adjust the signal level to achieve an optimum level of the RF voltage signal for efficient drive into output stage circuitry 106.

RF conditioning circuitry 418 may adjust the signal level of the RF voltage signal in any suitable way. For example, RF conditioning circuitry 418 may include a variable attenuator or a programmable gain amplifier. Further, portions of driver circuitry 104A other than or in addition to RF conditioning circuitry 418 may be configured to adjust the signal level of the RF voltage signal, $V_{RF}$, in response to input level control signals from controller 102. For example, one or more of digital IF generation circuitry 408, DACs 410 and 412, and RF mixer 414 may be configured to adjust the signal level of the RF voltage signal, $V_{RF}$, in other embodiments allowing the gain or gains of digital IF generation circuitry 408, DACs 410 and 412, and/or RF mixer 414 to be adjusted by controller 102.

In other embodiments, driver circuitry 104 may include any other suitable types and arrangements of circuitry configured to generate an RF voltage signal. For example, digital IF generation circuitry 408 may be omitted in other embodiments.

Referring back to FIG. 1, communications device 10 is configured to drive the impedances that may be encountered with varying antenna types using output stage circuitries 106 and 108, antenna ports 110 and 112, and tuning circuitry 114.

Output stage circuitry 106 generates the first RF output signal, $V_{OUT1}$, in response to receiving an RF input signal, $V_{RF}$, from driver circuitry 104 and provides the first RF output signal to antenna port 110 and output stage circuitry 108. Antenna port 110 receives the first RF output signal from output stage circuitry 106 and provides the RF output signal to antenna 130. Controller 102 provides control signals to output stage circuitry 106 to adjust the output signal level, i.e. amplitude, generated by output stage circuitry 106. Output stage circuitry 106 is configured to present a high impedance to antenna port 110 and antenna 130.

In one embodiment, output stage circuitry 106 includes an amplifying stage with a high impedance output that produces the RF output current, $I_{OUT}$. The RF output signal voltage on signal line 107 is determined from the RF output current produced by the amplifying stage and the total load impedance, $Z_{LOAD}$, of antenna 130 as shown in Equation I.

$$V_{OUT1} = I_{OUT} * Z_{LOAD} \qquad \text{EQUATION I}$$

In this embodiment, controller 102 provides control signals to output stage circuitry 106 to adjust the amount of output current generated by output stage circuitry 106. By adjusting the output current, controller 102 adjusts the output signal voltage level on signal line 107. For high impedance antennas coupled to antenna port 110, (e.g., in embodiments where antenna 130 is short monopole antenna 312 or resonated loop antenna 322), output stage circuitry 106 provides a power efficient way to produce a voltage on antenna 130.

Figure 5:
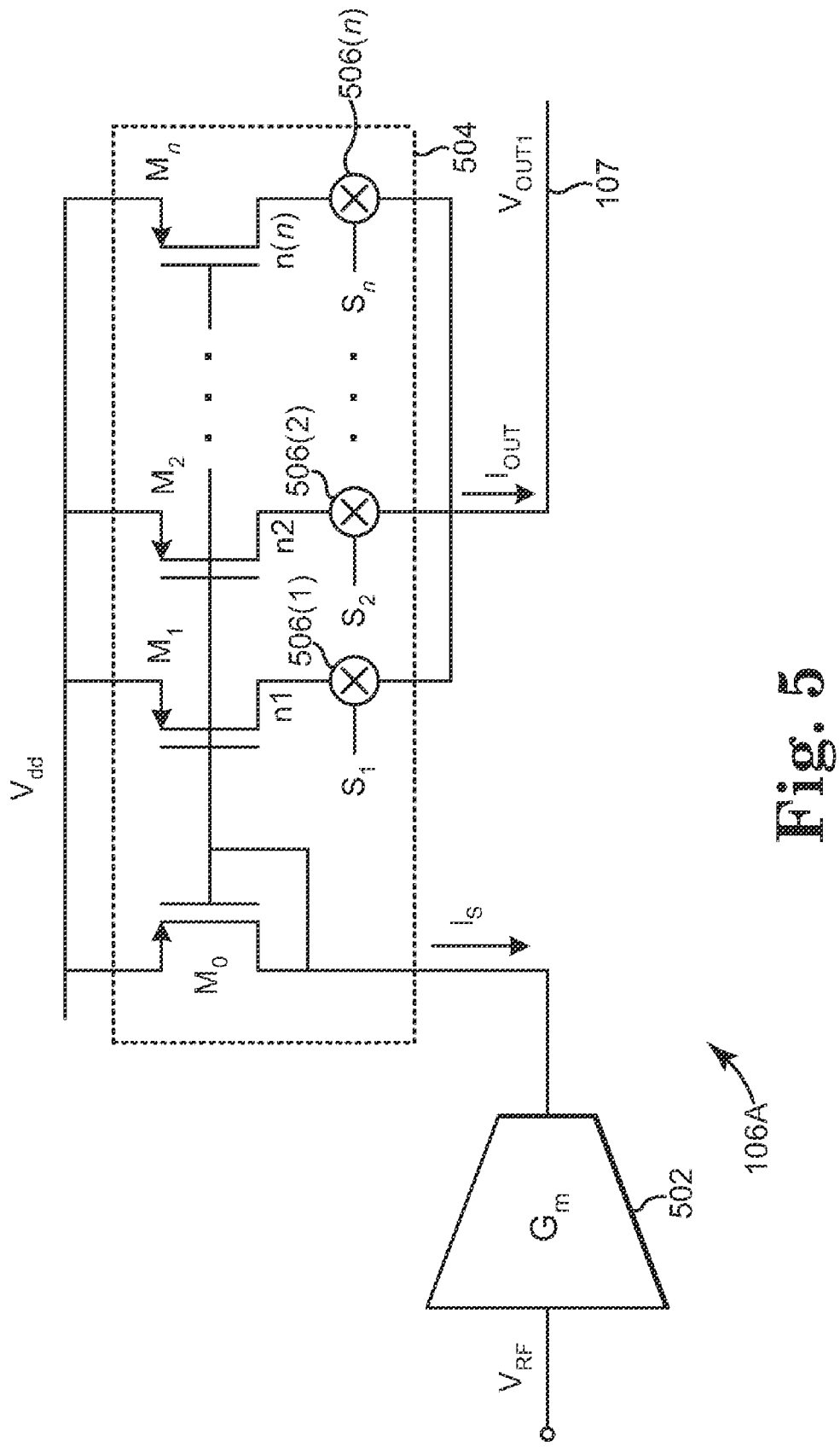
FIG. 5 is a schematic diagram illustrating one embodiment of output stage circuitry with adjustable output level circuitry.

FIG. 5 is a schematic diagram illustrating an embodiment 106A of output stage circuitry 106 with a transconductance amplifier 502 and adjustable output level circuitry 504. Transconductance amplifier 502 is a high impedance amplifier that generates a signal current, $I_S$, in proportion to the voltage of RF input signal, $V_{RF}$. Adjustable output level circuitry 504 includes transistors $M_0$ through $M_n$ and switches 506(1) through 506(n), where n is an integer greater than or equal to two.

Transistors $M_0$ and $M_1$ form a current mirror, with the output current from transistor $M_1$ being related to the current in $M_0$ by a ratio of n1. Similarly, the current in $M_2$ is proportional to the current in $M_0$ by a ratio of n2, and the current in $M_n$ is proportional to the current in $M_0$ by a ratio of n(n).

Switches 506(1) through 506 (n) are in series with the output current of transistors $M_1$ through $M_n$, respectively. Controller 502 provides control signals $S_1$ through $S_n$ to switches 506(1) through 506(n), respectively, to turn on or off the output current from each transistor $M_1$ through $M_n$ on signal line 107. The sum of the currents on signal line 107 forms the RF output current $I_{OUT}$. Control signals $S_1$ through $S_n$ collectively form the output level control signals shown in FIG. 1.

Controller 102 controls the output voltage provided to antenna port 110 by adjusting the output signal current. The power dissipated by output stage circuitry 106A may only need to be sufficient to produce a desired signal current and resulting output voltage on signal line 107.

Referring back to FIG. 1, output stage circuitry 106 may also be used to drive a low impedance load (e.g., a 50 ohm load) such as quarter-wave antenna 302 or test equipment. Because of the low impedance load, the output voltage on signal line 107 may not need to be as large for a given output current. The reduced voltages may allow quarter-wave antenna 302 or test equipment to operate with acceptable performance for the application. Output stage circuitry 106 is therefore a power efficient way of generating a small signal for these applications.

A low impedance load may reduce the Q of LC filter circuitry 140 and thereby reduce the effectiveness of LC filter circuitry 140 in filtering undesired RF signals. If a communications system does not require additional filtering of undesired RF signals, then antenna port 110 may provide a power efficient circuit for driving a low impedance load at modest signal levels.

If additional filtering is desired, then output stage circuitry 108 and antenna port 112 may be used for low impedance loads, such as quarter-wave antenna 302 or test equipment, or other loads that have an impedance that differs from the impedance presented on antenna port 110. Output stage circuitry 108 generates the second RF output signal, $V_{OUT2}$, in response to receiving the first RF output signal, $V_{OUT1}$, from output stage circuitry 106 and provides the second RF output signal to antenna port 112. Antenna port 112 receives the second RF output signal from output stage circuitry 108 and provides the RF output signal to a coupled antenna (not shown).

In one embodiment, output stage circuitry 108 includes an amplifier (not shown) with an impedance that differs from the impedance of output stage circuitry 106 and, more particularly, from adjustable level circuitry 504 in output stage circuitry 106A. The impedance of the amplifier of output stage circuitry 108 may be selected to match the impedance of a load or be higher or lower than the impedance of a load. The amplifier may be turned off by controller 102 to save power when it is not used. Output stage circuitry 108 is configured to present an impedance to antenna port 112 and an antenna coupled to antenna port 112 (not shown) that differs from the impedance presented by output stage circuitry 106 to antenna port 110 and antenna 130.

In other embodiments, output stage circuitry 108 includes adjustable level circuitry (not shown) configured to allow controller 102 to adjust the signal level of the second RF output signal, $V_{OUT2}$, on signal line 109. In these embodiments, the adjustable level circuitry may have an impedance that differs from the impedance of output stage circuitry 106 and, more particularly, from adjustable level circuitry 504 in output stage circuitry 106A.

As noted above, tuning circuitry 114 and inductor 132 combine to form LC filter circuitry 140. With some antennas, such as loop antenna 322 (FIG. 3C), inductor 132 may be the inductance of the antenna rather than a separate inductor. Controller 102 provides control signals to tuning circuitry 114 to adjust the amount of capacitance and/or resistance of that tuning circuitry 114 provides on antenna port 110 to adjust the LC filter response of LC filter circuitry 140. By adjusting the amount of capacitance and/or resistance of tuning circuitry 114, controller 102 also affects the signal response on antenna port 112.

Figures 6, 9:
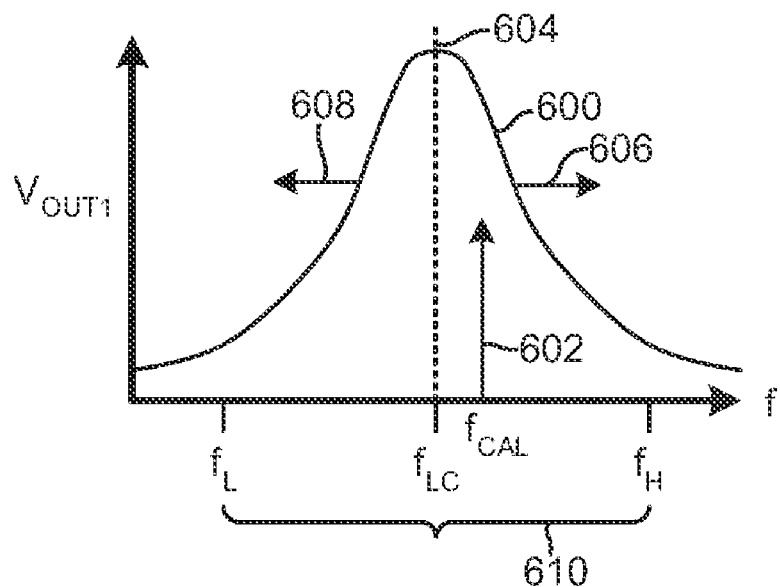
FIG. 6 is a graphical diagram illustrating one embodiment of an LC filter response.
FIG. 9 is a table illustrating one embodiment of information for use in compensating for parameters of an antenna.

FIG. 6 is a graphical diagram illustrating one embodiment of an LC filter response 600 of LC filter circuitry 140 with respect to a signal 602 on signal line 107. Filter response 600 has a center frequency of $f_{LC}$ that is indicated by a dotted line 604 and a tuning range 610 that varies from a low frequency $f_L$ to a high frequency $f_H$. Signal 602 has a frequency of $f_{CAL}$. By adjusting the tuning of tuning circuitry 114, controller 102 moves LC filter response 600 up or down within the tuning range 610 for LC filter circuitry 140 as indicated by arrows 606 and 608, respectively. Signal 602 strengthens as controller 102 aligns it closer to center frequency 604 for LC filter response 600. Accordingly, controller 102 may improve and/or optimize the strength of signal 602 on signal line 107 in the process of tuning LC filter circuitry 140 for a desired channel or frequency of signal 602.

In the process of tuning signal 602, controller 102 activates switch 118B to couple level detect circuitry 116 to the first RF output signal, $V_{OUT1}$, on signal line 107. Level detect circuitry 116 detects the signal level of the first RF output signal and provides any suitable inputs to controller 102 to identify the signal level of the first RF output signal to controller 102. Controller 102 may iteratively adjust the tuning of tunable circuitry 114 and receive feedback from level detect circuitry 116 until a desired tuning is achieved.

To tune tuning circuitry 114, controller 102 provides control signals to select a capacitance and/or a resistance of tuning circuitry 114. FIG. 7A is a schematic diagram illustrating an embodiment 114A of tuning circuitry 114. Tuning circuitry 114A includes a variable capacitor 702 and a variable resistor 704 coupled in parallel between signal line 107 and ground. Controller 102 provides control signals 706 to adjust variable capacitor 702 and variable resistor 704 to adjust the tuning of tuning circuitry 114A. Variable capacitor 702 may be any suitable circuitry configured to allow the capacitance of the circuitry to be adjusted by controller 102, and variable resistor 704 may be any suitable circuitry configured to allow the resistance of the circuitry to be adjusted by controller 102.

FIG. 7B is a schematic diagram illustrating another embodiment 114B of tuning circuitry 114. Tuning circuitry 114B includes a set of cells 710(1) through 710(m), where m is an integer greater than or equal to one, and referred to herein individually as a cell 710 or collectively as cells 710. Each cell 710 include a capacitive element 712, a pair of transistors 714 and 716, and a resistive element 718 that are in parallel. Each capacitive element 712 couples between signal line 107 on one end and transistor 714 and resistive element 718 on the other end. Each transistor 714 forms a switch between capacitive element 712 and ground that is controlled by a respective one of a set of signals 720 from controller 102, where the set of signals 720 includes signals 720(1) through 720(m). Each transistor 716 forms a switch between resistive element 718 and ground that is controlled by a respective one of a set of signals 722 from controller 102, where the set of signals 722 includes signals 722(1) through 722(m).

Capacitive elements 712 may each have the same or different nominal capacitances. For example, a first group of ten cells 710 may have capacitive elements 712 with nominal capacitances of 4 pF, a second group of seven cells 710 may have capacitive elements 712 with nominal capacitances of 1 pF, and a third group of seven cells 710 may have capacitive elements 712 with nominal capacitances of 0.25 pF according to one embodiment.

In a normal mode of operation, controller 102 selectively activates switches 714 to select the amount of capacitance of tuning circuitry 114B. By activating switch 714 in a given cell 710, controller 102 causes a capacitive element 712 to be coupled between signal line 107 and ground in the given cell 710. Controller 102 causes a capacitive element 712 to float (i.e., not be coupled between signal line 107 and ground) by de-activating a switch 714 in a given cell 710. To increase the capacitance of tuning circuitry 114B, controller 102 may increase the number of capacitive elements 712 coupled between signal line 107 and ground using signals 720. Likewise, controller 102 may increase the number of floating capacitive elements 712 to decrease the capacitance of tuning circuitry 114B.

In a low Q mode of operation, controller 102 selectively activates switches 716 to select the amount of capacitance and the amount of resistance of tuning circuitry 114B. By increasing the amount of resistance of tuning circuitry 114B, controller 102 lowers the overall Q of LC filter circuitry 140 in the low Q mode of operation.

Because output stage 106 has a high impedance, antenna port 110 forms a high impedance node and LC filter circuitry 140 forms a high Q filter. The Q of LC filter circuitry 140 is determined by the ratio of total equivalent parallel resistance to the reactance of either inductor 132 or the capacitance of tuning circuitry 114 (i.e., the inductor 132 or the capacitance of tuning circuitry 114 have the same value at resonance). In addition, the Q of LC filter circuitry 140 is the ratio of the center frequency of the filter to the bandwidth of the filter. Because of the high Q, LC filter response 600 of LC filter circuitry 140 may be narrow and may reduce undesirable signals, such as signal harmonics, generated by components of transmitter circuitry 100. The high Q, however, may increase the difficulty of tuning LC filter circuitry 140.

To decrease the effective Q of tuning LC filter circuitry 140, controller 102 adjusts the amount of resistance of tuning circuitry 114B by selectively activating switches 716 to couple selected resistive elements 718 to ground. In this way, controller 102 is configured to adjust the resistance of tuning circuitry 114B.

By activating switch 716 in a given cell 710, controller 102 causes a capacitive element 712 and a resistive element 718 to be coupled in series between signal line 107 and ground in the given cell 710. Controller 102 causes a capacitive element 712 to float (i.e., not be coupled between signal line 107 and resistive element 718) by de-activating a switch 716 in a given cell 710. To increase the capacitance and the resistance of tuning circuitry 114B, controller 102 may increase the number of capacitive elements 712 and resistive elements 718 that are coupled in series between signal line 107 and ground using signals 720. Likewise, controller 102 may decrease the number of capacitive elements 712 and resistive elements 718 that are coupled in series between signal line 107 and ground using signals 720 to decrease the capacitance and the resistance of tuning circuitry 114B.

FIGS. 7A and 7B illustrate example embodiments 114A and 114B of tuning circuitry 114. In other embodiments of tuning circuitry 114, other capacitive elements or inductive elements may be used, and the other elements may be located on-chip or off-chip of communications device 10. In addition, other types and/or numbers of control signals may be provided from controller 102 or an off-chip controller (not shown) to adjust any of the embodiments of tuning circuitry 114. Further, other arrangements of resistive elements may be used to allow the resistance of tuning circuitry 114 to be adjusted in other ways.

Referring back to FIG. 1, communications device 10 is configured to operate in a calibration mode of operation. During the calibration mode of operation, controller 102 adjusts the signal level of the RF voltage signal, $V_{RF}$, adjusts the signal level of the first RF output voltage signal, $V_{OUT1}$, and tunes LC filter circuitry 140 to optimize the operation of communications device 10. Controller 102 may perform these functions in any suitable order. Controller 102 performs these functions by providing control signals to driver circuitry 104, output stage circuitry 106, and LC filter circuitry 140, respectively, as described in additional detail above.

During the calibration mode of operation, transmitter circuitry 100 generates a calibration signal and transmits the calibration signal on signal line 107. Transmitter circuitry 100 generates the calibration signal with any suitable frequency for calibrating communications device 10. For example, transmitter circuitry 100 may generate the calibration signal at a desired channel frequency at a frequency offset by some selected value from a desired channel frequency, or any other suitable desired frequency such as a frequency that falls within the 3 dB point for LC filter circuitry 140 while still maintaining performance.

Controller 102 may provide information to transmitter 100 to select a desired frequency of the calibration signal. In one embodiment, controller 102 receives a user input from user 152 that indicates the desired frequency of operation of communications device 10. In this embodiment, controller 102 provides information associated with the user input to cause transmitter 100 to set the frequency of the calibration signal to the desired frequency of operation of the user. In another embodiment, controller 102 accesses predefined information regarding a frequency to use for the calibration signal.

Transmitter circuitry 100 generates the calibration signal at a signal level selected by controller 102. Controller 102 provides control signals to driver circuitry 104 and/or output stage circuitry 106 to cause transmitter circuitry 100 to generate the calibration signal at a designated signal level. Controller 102 selectively receives feedback from level detect circuitry 116 corresponding to the signal levels generated for the RF voltage signal, $V_{RF}$, and the first RF output voltage signal, $V_{OUT1}$.

In one embodiment, controller 102 receives a user input from user 152 that indicates the desired a signal level of communications device 10. In this embodiment, controller 102 provides information associated with the user input to driver circuitry 104 and/or output stage circuitry 106 to cause transmitter 100 to set the signal level of the calibration signal to the desired signal level. In another embodiment, controller 102 accesses predefined information regarding a signal level to use for the calibration signal for one or more frequencies of the calibration signal.

Controller 102 adjusts tuning circuitry 114 during the calibration mode to adjust filter response 600 of LC tuning circuitry 140 using control signals provided to tuning circuitry 114 so that it tends to maximize or otherwise optimize the strength of the calibration signal on signal line 107. In this way, filter response 600 may be adjusted, improved, and/or optimized to tune the center frequency of LC filter circuitry 140. In one or more embodiments, controller 102 adjusts the capacitance and/or resistance of tuning circuitry 114 as described above with reference to the embodiments 114A and 11B of FIGS. 7A and 7B, respectively, to optimize the strength of the calibration signal on signal line 107. As noted above with reference to FIG. 7B, controller 102 may adjust the resistance of tuning circuitry 114 based on the Q filter circuitry 114. Controller 102 selectively receives feedback from level detect circuitry 116 corresponding to the first RF output voltage signal, $V_{OUT1}$. Controller 102 may use the feedback to iteratively adjust the capacitance and/or resistance of tuning circuitry 114 to optimize filter response 600 of LC tuning circuitry 140 using any suitable successive approximation techniques.

Controller 102 may initiate the calibration mode of operation each time a new channel of communications device 10 is tuned. A new channel may be tuned in response to communications device 10 being powered up or reset, user 152 providing a new channel tuning, or controller 102 detecting a significant change in environmental variables, such as temperature, that may affect circuitry in communications device 10. The calibration mode of communications device 10 may occur over a relatively short period of time such that user 152 may not notice that communications device 10 transmits the calibration signal during the calibration mode. After completing a calibration of communications device 10 in the calibrations mode, controller 102 may store calibration information for use as starting points in subsequent calibrations or for error log information. Communications device 10 may begin a normal mode of operation subsequent to the calibration mode using the signal level and tuning settings for transmitter 100 and tuning circuitry 114, respectively, determined during the calibrations mode.

Figure 8:
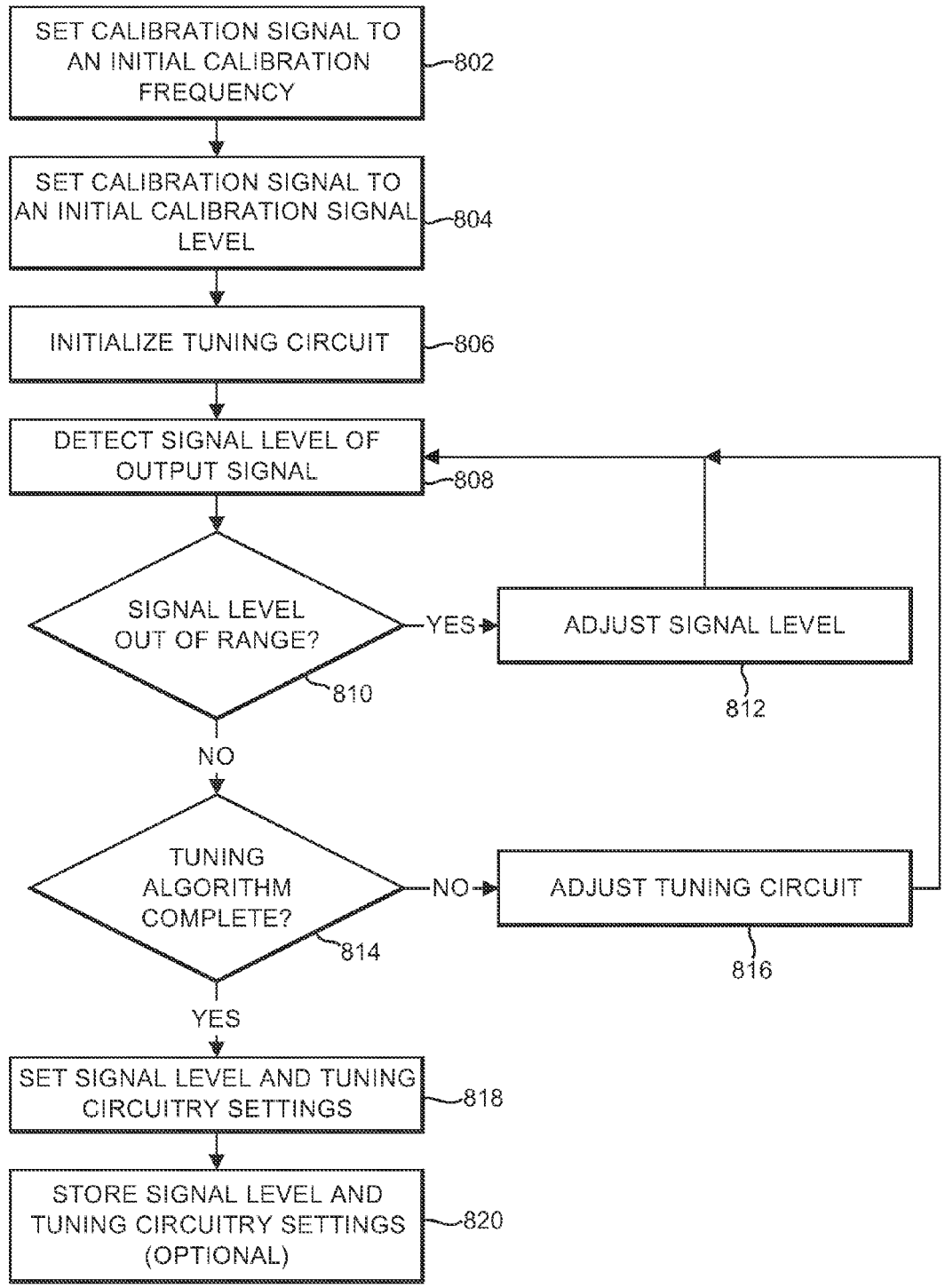
FIG. 8 is a flow chart illustrating one embodiment of a method for calibrating a communications device.

Various algorithms may be implemented to accomplish the calibration contemplated by the calibration mode. FIG. 8 is a flow chart illustrating one embodiment of a method for calibrating communications device 10. The embodiment of the method of FIG. 8 will be described with reference to the embodiment of communications device 10 shown in FIG. 1.

In FIG. 8, controller 102 sets a calibration signal to an initial calibration frequency as indicated in a block 802. The calibration frequency may be set in response to a user input from user 152 or a predefined frequency accessed by or stored in controller 102. Controller 102 provides control signals to driver circuitry 104 to sets the calibration frequency of the calibration signal according to one embodiment.

Controller 102 sets the calibration signal to an initial calibration signal level as indicated in a block 804. The calibration signal level may be set in response to a user input from user 152 or a predefined signal level accessed by or stored in controller 102. Controller 102 provides control signals to driver circuitry 104 and output stage circuitry 106 to sets the calibration signal level of the calibration signal according to one embodiment.

Controller 102 initializes tuning circuitry 114 as indicated in a block 806. Controller 102 provides control signals to tuning circuitry 114 to set initial capacitance and/or resistance values of tuning circuitry 114. The initial values may be predefined values accessed by or stored in controller 102 or may be values generated by previous calibrations and stored by controller 102.

Controller 102 detects a signal level of the first RF output voltage signal, $V_{OUT1}$, of transmitter circuitry 100 as indicated in a block 808. Controller 102 activates switch 118B to cause level detect circuitry 116 to detect the signal level on signal line 107 according to one embodiment. Controller 102 receives information corresponding to the signal level from level detect circuitry 116 to detect the signal level.

A determination is made by controller 102 as to whether the signal level detected in block 808 is out of range as indicated in a block 810. In one embodiment, controller 102 compares the signal level to a range of signal values to make the determination. If the signal level is out of range, then controller 102 adjusts the signal level as indicated in a block 812. Controller 102 adjusts the signal level by providing control signals to driver circuitry 104 and/or output stage circuitry 106.

If the signal level is not out of range, then a determination is made by controller 102 as to whether a tuning algorithm is complete as indicated in a block 814. Controller 102 may determine whether the tuning algorithm is complete by comparing the signal level detected in block 808 with any number of previously detected signal levels (i.e., signal levels detected in performing previous iterations of the function of block 808) or other predefined information accessible to or stored in controller 102. In one embodiment, the tuning algorithm may complete when controller 102 identifies a peak signal response using the signal levels from the iterations of performing the function of block 808. In other embodiments, the algorithm may complete when other criteria are met.

If the tuning algorithm is not complete, then controller 102 adjusts tuning circuitry 114 as indicated in a block 816. Controller 102 adjusts tuning circuitry 114 by providing control signals that cause the capacitance and/or resistance of tuning circuitry 114 to be increased or decreased. Controller 102 may iteratively adjust tuning circuitry 114 by repeatedly performing the function of blocks 814 and 816. For example, controller 102 may perform coarse, medium, and fine tuning of tuning circuitry 114 by adding or removing high, medium, and low capacitance values, respectively, during the iterations.

If the tuning algorithm is complete, then controller 102 sets the signal level and tuning circuitry settings determined by the algorithm as indicated in a block 818. In particular, controller 102 provides control signals to driver circuitry 104 and output stage circuitry 106 to sets the optimal signal level of the first RF output voltage signal, $V_{OUT1}$, as determined by the algorithm and controller 102 provides control signals to tuning circuitry 114 to set the optimal the capacitance and/or resistance of tuning circuitry 114.

Controller 102 optionally stores the signal level and tuning circuitry settings in a location that is accessible by or within controller 102 as indicated in a block 820. The stored signal level and tuning circuitry settings may be accessed by controller 102 for use during subsequent calibrations.

In addition to the calibration mode just described, controller 102 is configured to adjust the signal level of the first RF output voltage signal, $V_{OUT1}$, on signal line 107 to compensate for properties of an antenna, such as antenna 130, coupled to antenna port 110 or antenna port 112. Controller 102 may receive antenna compensation information from user 152 or may access stored antenna compensation information associated with various antennas within communications device 10. The antenna compensation information may include compensation information for any number of frequencies of the first RF output voltage signal. Controller 102 may be configured to interpolate the amount of compensation using any suitable linear or non-linear function for various frequencies using antenna compensation information provided by a user.

Controller 102 uses the antenna compensation information to set the signal level of the first RF output voltage signal to desired signals levels at various frequencies of the first RF output voltage signal. Controller 102 adjusts the signal level by providing control signals to driver circuitry 104 and/or output stage circuitry 106. In embodiment 106A of output stage circuitry 106 (FIG. 5), controller 102 adjusts the output current, $I_{OUT}$, of adjustable output level circuitry 504 to set the signal level of the first RF output voltage signal.

FIG. 9 is a table illustrating one embodiment of antenna compensation information 900 for use in compensating for parameters of an antenna. Antenna compensation information 900 indicates an amount of compensation to adjust the signal level of the first RF output voltage signal on signal line 107 for various frequencies. As indicated by antenna compensation information 900, controller 102 increases the signal level of the first RF output voltage signal by 10% when the frequency of the first RF output voltage signal is set to 76 MHz. Similarly, controller 102 decreases the signal level of the first RF output voltage signal by 10% when the frequency is set to 108 MHz. Controller 102 also increases the signal level by 5% when the frequency is set to 84 MHz and decreases the signal level by 5% when the frequency is set to 100 MHz. At certain frequencies, e.g., 92 MHz in the example shown in FIG. 9, controller 102 may not provide any compensation for an antenna. Accordingly, controller 102 may not adjust the signal level of the first RF output voltage signal subsequent to the calibration for these frequencies. Controller 102 may also interpolate between data points using any suitable function for intermediate frequencies, such as 92 MHz in the example of FIG. 9.

Figure 10:
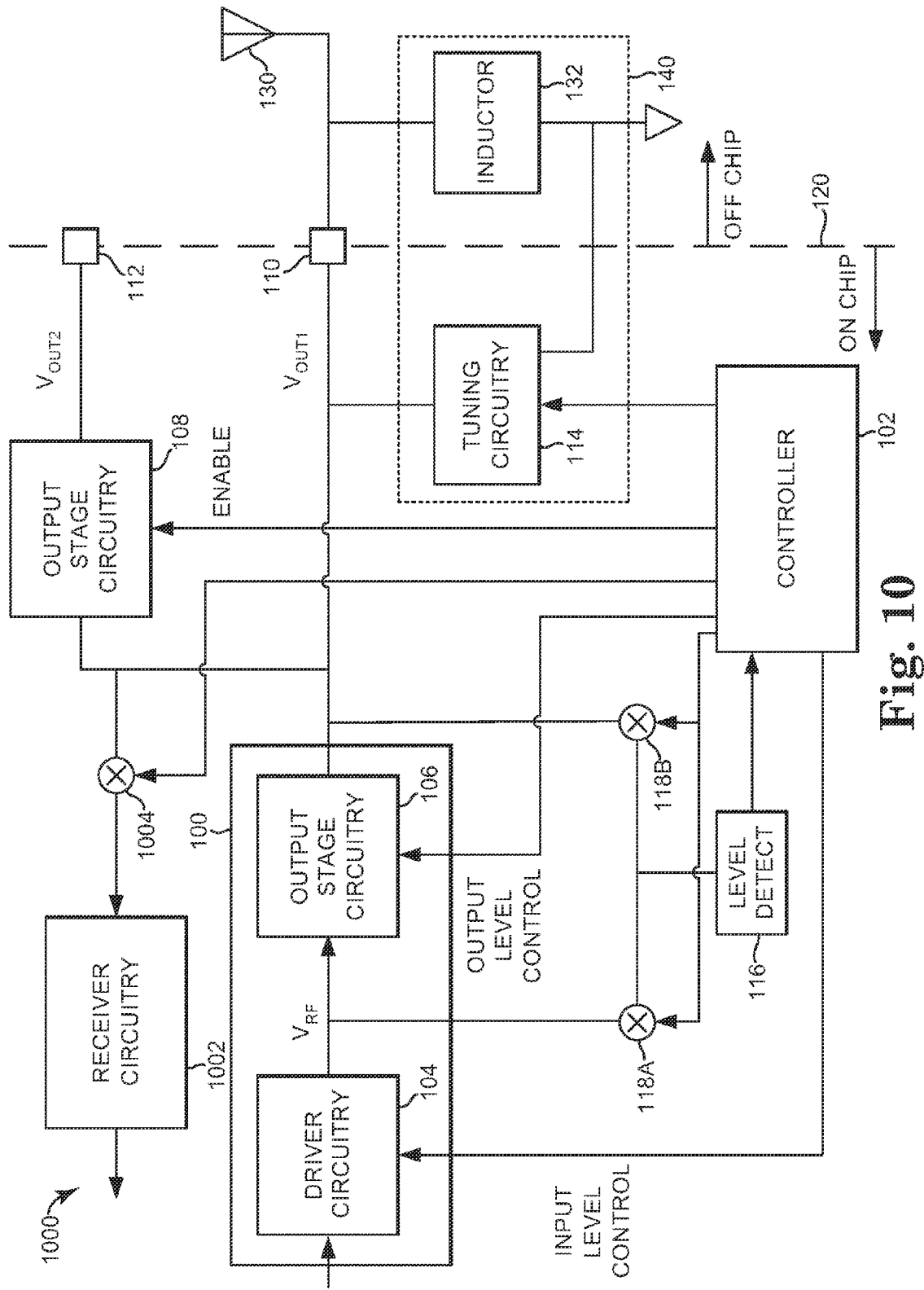
FIG. 10 is a block diagram illustrating another embodiment of a communications device.

FIG. 10 is a block diagram illustrating one embodiment of a communications device 1000 with receiver circuitry 1002 that shares at least antenna port 110 with transmitter circuitry 100.

Transmitter circuitry 100 and receiver circuitry 1002 may each use the same antenna (e.g., antenna 130 on antenna port 110) or may use different antennas (e.g., transmitter circuitry 100 may use an antenna (not shown) on antenna port 112 and receiver circuitry 1002 may use antenna 130 on antenna port 110). Controller 102 operates a switch 1004 to selectively connect and disconnect receiver circuitry 1002 from antenna port 110. In one embodiment, controller 102 connects receiver circuitry 1002 to antenna port 110 in a receive mode of operation and disconnects receiver circuitry 1002 from antenna port 110 in a transmit mode of operation. In other embodiments, receiver circuitry 1002 is also coupled to and shares antenna port 112. In this embodiment, controller 102 may operate an additional switch (not shown) to selectively connect and disconnect receiver circuitry 1002 from antenna port 112.

Tuning circuitry 114, level detect circuitry 116, and controller 102 may be used to calibrate and tune both output signals from the transmitter and input signals received by receiver circuitry 1002 across antenna port 110 using antenna 130. Transmitter circuitry 100 may be used to generate calibration signals as described above for use in calibrating tuning circuitry 114 for a receive mode of operation such that transmitter circuitry 100 is turned off subsequent to the calibration completing. If a tuning error occurs as a result of turning off transmitter circuitry 100 during the receive mode, the error may be compensated for through knowledge of the circuit parameters of transmitter circuitry 100.

In the embodiment of FIG. 10, each antenna port 110 and 112 forms a input/output pad in integrated communications device 1000 that includes a conductor configured to couple to an antenna or other circuitry that is external to communications device 1000. The input/output pads may be coupled to electrostatic discharge (ESD) protection circuitry (not shown) or other input or output buffer circuitry (not shown) in communications device 1000. In the embodiment shown in FIG. 10, an antenna 130 and an inductor 132 connect to antenna port 110. In other embodiments, antenna 130 and inductor 132 are omitted and another antenna (not shown) connects to antenna port 112. In further embodiments, inductor 132 may omitted, may be located integrated on-chip with communications device 1000, or may be included with antenna 130.

Figure 11:
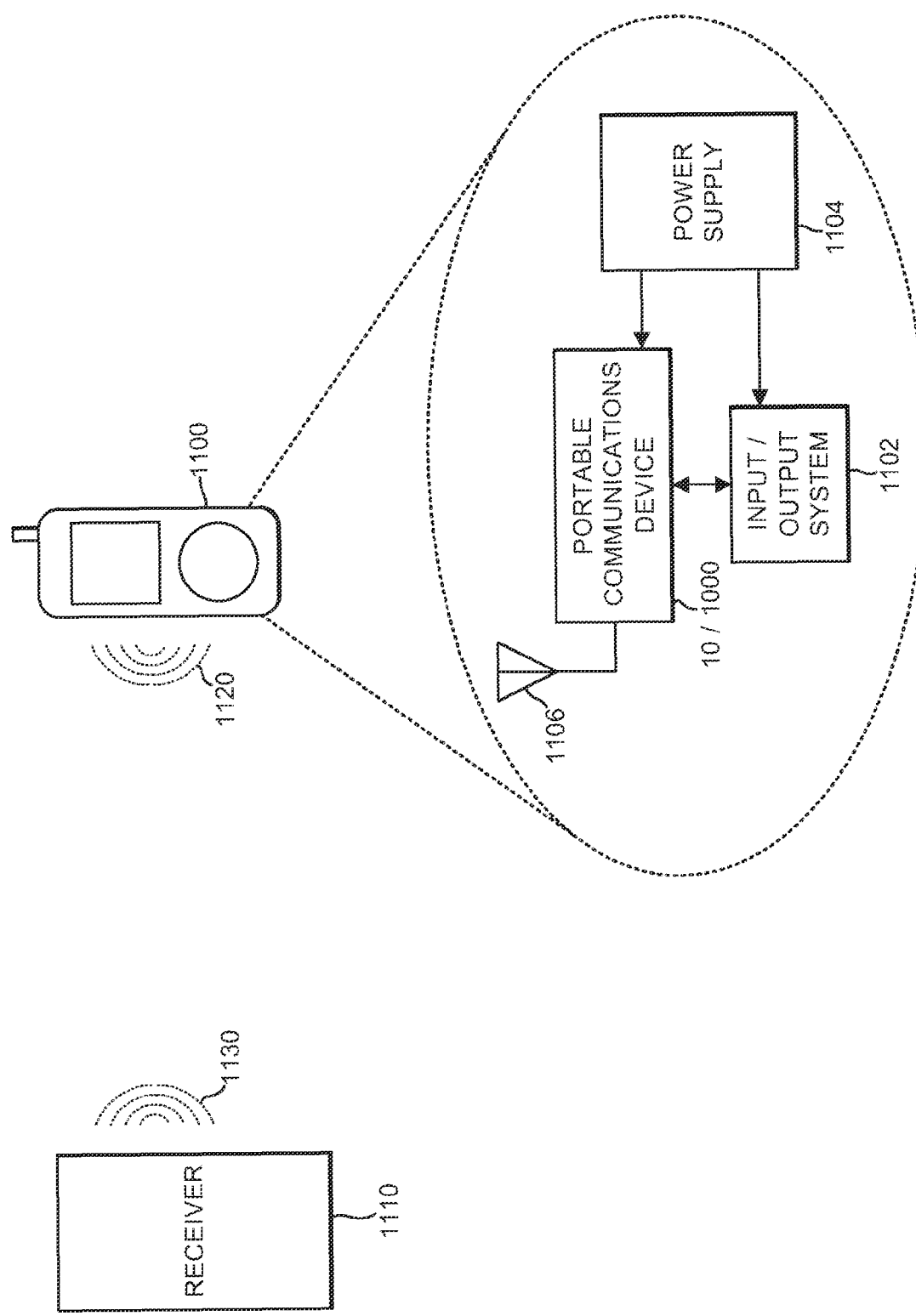
FIG. 11 is a block diagram illustrating one embodiment of a portable communications system that includes a communications device.

FIG. 11 is a block diagram illustrating one embodiment of a portable communications system 1100 that includes communications device 10 as shown in FIG. 1 or communications device 1000 as shown in FIG. 10. Portable communications system 1100 may be any type of portable or mobile communications device such as a mobile or cellular telephone, a personal digital assistant (PDA), an audio and/or video player (e.g., an MP3 or DVD player), a wireless telephone, and a notebook or laptop computer. Portable communications system 1100 includes communications device 10 (FIG. 1) or 1000 (FIG. 10), an input/output system 1102, a power supply 1104, and an antenna 1106 among other components. Antenna 1106 may couple to either antenna port 110 or antenna port 112 of Input/output system 1102 receives information from a user and provides the information to communications device 10 or 1000. Input/output system 1102 also receives information from mobile communications device 10 or 1000 and provides the information to a user. The information may include voice and/or data communications, audio, video, image, or other graphical information. Input/output system 1102 includes any number and types of input and/or output devices to allow a user provide information to and receive information from portable communications system 1100. Examples of input and output devices include a microphone, a speaker, a keypad, a pointing or selecting device, and a display device.

Power supply 1104 provides power to portable communications system 1100, input/output system 1102, and antenna 1106. Power supply 1104 includes any suitable portable or non-portable power supply such as a battery or an AC plug.

In embodiments that include communications device 10, communications device 10 communicates with a receiver 1110 or one or more remotely located hosts (not shown) in radio frequencies using antenna 1106. Communications device 1000 transmits information to receiver 1110 or one or more remotely located hosts in radio frequencies using antenna 1106 as indicated by a signal 1120. In other embodiments, communications device 1000 communicates with receiver 1110 or one or more remotely located hosts using other frequency bands.

In embodiments that include communications device 1000, communications device 1000 communicates with receiver 1110 or other remotely located hosts in radio frequencies using antenna 1106. Communications device 1000 transmits information to receiver 1110 or other remotely located hosts in radio frequencies using antenna 1106 as indicated by a signal 1120. Communications device 1000 receives information from receiver 1110 or other remotely located hosts in radio frequencies using antenna 1106 as indicated by a signal 1130. In other embodiments, communications device 1000 communicates with receiver 1110 or one or more remotely located hosts using other frequency bands.

In the above embodiments, a variety of circuit and process technologies and materials may be used to implement the communications systems according to the invention. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), and a combination of BJTs and CMOS (BiCMOS).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A communications device comprising:
    a first antenna port coupled to a signal line;
    transmitter circuitry including first output stage circuitry coupled to the signal line and configured to generate a radio frequency (RF) output signal having an RF frequency across the first antenna port, the first output stage circuitry forming a first amplifier that provides a first impedance on the first antenna port;
    tuning circuitry coupled to the signal line, the tuning circuitry comprising at least one variable capacitor coupled in parallel with at least one inductor between the signal line and a first node;
    level detect circuitry configured to detect the amplitude of the RF output signal on the signal line and to provide information corresponding to the detected amplitude of the RF output signal; and
    a controller configured to receive the information corresponding to the detected amplitude of the RF output signal from the level detect circuitry, and to adjust a capacitance of the tuning circuitry to increase the amplitude of the RF output signal on the signal line.

2. The communications device of claim 1 wherein the first node comprises ground; where the tuning circuitry includes at least one variable capacitor connected in parallel with at least one inductor between the signal line and ground, and wherein the inductor provides an impedance that, at least in part, generates the amplitude of the RF output signal on the signal line.

3. The communications device of claim 1 further comprising:
    an antenna coupled to the first antenna port with the at least one variable capacitor and the at least one inductor of the tuning circuitry each being coupled to the signal line at a second node between the antennae and the transmitter circuitry.

4. The communications device of claim 3 wherein the amplifier comprises a high impedance amplifier; and where the antenna comprises a high impedance antenna having an impedance of at least one kilo-ohm.

5. The communications device of claim 3 wherein the controller is configured to adjust the capacitance of the tuning circuitry to resonate the antenna.

6. The communications device of claim 1 wherein the controller is configured to adjust the capacitance of the tuning circuitry to resonate an antenna coupled to the first antenna port.

7. The communications device of claim 1 further comprising:
    a second antenna port; and
    second output stage circuitry having an input coupled to the signal line and configured to broadcast a second RF output signal generated from the first RF output signal across the second antenna port, the second output stage circuitry forming a second amplifier that provides a second impedance on the second antenna port;
    where the first amplifier comprises a high impedance amplifier and the first impedance is a high impedance, and where the second amplifier comprises a low impedance amplifier and the second impedance comprises a low impedance.

8. The communications device of claim 1, where the first node comprises ground; and wherein the tuning circuitry includes a a plurality of cells, each of the plurality of cells including a capacitive element coupled in series with a switch between the signal line and ground.

9. The communications device of claim 1 wherein the controller is configured to adjust a resistance of the tuning circuitry.

10. The communications device of claim 1, where the controller is further configured to iteratively adjust the capacitance of the tuning circuitry to maximize the amplitude of the RF output signal on the signal line.

11. A method performed by a controller in a communications device, the method comprising:
    generating a radio frequency (RF) output signal having an RF frequency from transmitter circuitry;
    adjusting a capacitance of tuning circuitry coupled on a signal line between the transmitter circuitry and a first antenna port to increase an amplitude of the radio frequency (RF) output signal on the signal line, the tuning circuitry comprising at least one variable capacitor coupled in parallel with at least one inductor between the signal line and a first node; and
    detecting the amplitude of the RF output signal on the signal line subsequent to adjusting the capacitance.

12. The method of claim 11 wherein the first node comprises ground; where the tuning circuitry includes at least one variable capacitor coupled in parallel with at least one inductor between the signal line and ground, and wherein the inductor provides an impedance that, at least in part, generates the amplitude of the RF output signal on the signal line.

13. The method of claim 11 further comprising:
    adjusting the capacitance of the tuning circuitry to resonate an antenna coupled to the first antenna port.

14. The method of claim 13 wherein the first amplifier comprises a high impedance amplifier; and where the antenna comprises a high impedance antenna having an impedance of at least one kilo-ohm.

15. The method of claim 11, where the first node comprises ground; and where the method further comprises:
    adjusting the capacitance of the tuning circuitry by adjusting a plurality of cells, each of the plurality of cells including a capacitive element coupled in series with a switch between the signal line and ground.

16. The method of claim 11 further comprising:
    adjusting a resistance of the tuning circuitry.

17. The method of claim 11, further comprising iteratively performing the steps of adjusting the capacitance of the tuning circuitry and then detecting the amplitude of the RF output signal to maximize the amplitude of the RF output signal on the signal line.

18. A communications system comprising:
    an antenna;
    a communications device including:
        an antenna port coupled to a signal line and the antenna;
        transmitter circuitry including output stage circuitry coupled to the signal line and configured to generate a radio frequency (RF) output signal across the antenna, the output stage circuitry forming an amplifier that provides a first impedance on the antenna port;

tuning circuitry coupled to the signal line, the tuning circuitry comprising at least one variable capacitor coupled in parallel with at least one inductor between the signal line and a first node;

level detect circuitry configured to detect the amplitude of the RF output signal on the signal line and to provide information corresponding to the detected amplitude of the RF output signal; and a controller configured to receive the information corresponding to the detected amplitude level of the RF output signal from the level detect circuitry, and to adjust a capacitance of the tuning circuitry to increase an amplitude of the RF output signal provided to the antenna; and an input/output system configured to communicate with the communications device.

19. The communications system of claim 18 wherein the first node comprises ground; where the tuning circuitry includes at least one variable capacitor coupled in parallel with at least one inductor between the signal line and ground, and wherein the inductor provides an impedance that, at least in part, generates the amplitude of the RF output signal on the high impedance antenna.

20. The communications system of claim 18 wherein the first amplifier comprises a high impedance amplifier; and where the antenna comprises a high impedance antenna having an impedance of at least one kilo-ohm.

21. The communications system of claim 18 wherein the controller is configured to adjust the capacitance of the tuning circuitry to resonate the high impedance antenna.

22. The communications system of claim 18, where the first node comprises ground; and wherein the tuning circuitry includes a a plurality of cells, each of the plurality of cells including a capacitive element coupled in series with a switch between the signal line and ground.

23. The communications system of claim 18, where the controller is further configured to iteratively adjust the capacitance of the tuning circuitry to maximize the amplitude of the RF output signal on the signal line.

* * * * *